US008570540B2

(12) United States Patent
Inui et al.

(10) Patent No.: US 8,570,540 B2
(45) Date of Patent: Oct. 29, 2013

(54) IMAGE FORMING APPARATUS FOR PROCESSING DOCUMENT DATA FILE CAPABLE OF PERFORMING PROCESSING AS SPECIFIED BY A USER ON A DOCUMENT DATA FILE TO BE PROCESSED EVEN IF THE USER LACKS ADEQUATE KNOWLEDGE

(75) Inventors: Kazuo Inui, Itami (JP); Hiroaki Kubo, Muko (JP); Nobuhiro Mishima, Osaka (JP); Kenji Matsuhara, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 746 days.

(21) Appl. No.: 12/512,124

(22) Filed: Jul. 30, 2009

(65) Prior Publication Data
US 2010/0046021 A1    Feb. 25, 2010

(30) Foreign Application Priority Data

Aug. 21, 2008    (JP) .................................. 2008-213090

(51) Int. Cl.
| G06F 3/12 | (2006.01) |
| G06F 17/00 | (2006.01) |
| G06F 7/04 | (2006.01) |
| G06K 15/22 | (2006.01) |
| H04N 1/60 | (2006.01) |

(52) U.S. Cl.
USPC ......... 358/1.13; 358/1.14; 358/1.15; 358/1.9; 726/1; 726/2; 726/17; 726/28

(58) Field of Classification Search
USPC .............. 358/1.13, 1.14, 1.15, 1.17, 1.1, 1.9, 358/401, 402, 501, 539; 715/527, 525, 526; 713/165, 167, 182, 183, 184, 185; 726/28, 726/2, 1, 9, 26, 10, 7, 17, 27, 29, 30, 32, 726/31, 33, 35, 36, 34
See application file for complete search history.

(56) References Cited

U.S. PATENT DOCUMENTS 7,791,746 B2 *  9/2010  Nomura et al. .............. 358/1.14
2005/0114766 A1 *  5/2005  Yamamoto ..................... 715/527
(Continued)

FOREIGN PATENT DOCUMENTS

| JP | 6-035907 A | 2/1994 |
| JP | 2004-252784 A | 9/2004 |

(Continued)

OTHER PUBLICATIONS

Notice of Grounds of Rejection dated Oct. 26, 2010, issued in the corresponding Japanese Patent Application No. 2008-213090, and an English Translation thereof.

(Continued)

Primary Examiner — Benny Q Tieu
Assistant Examiner — Ngon Nguyen
(74) Attorney, Agent, or Firm — Buchanan Ingersoll & Rooney PC (57) ABSTRACT

In the case where an attribute of a general-purpose file to be processed is an attribute inhibiting printing, an MFP selects a transmission function, which is one of output functions of the MFP, as a function that can be performed (selected) in response to an output instruction, and displays a screen for transmission. In the case of an attribute permitting a document assembly function, the MFP determines that a bind function is a function that can be performed (selected), and displays a screen for the function. In the case of an attribute inhibiting the document assembly function, the MFP determines that a function of adding information to a file, which is one of the output functions of the MFP that does not implement the document assembly function, is a function that can be performed (selected), and displays a screen for the function.

10 Claims, 9 Drawing Sheets

U.S. PATENT DOCUMENTS

| | | | |
|---|---|---|---|
| 2005/0231759 A1 | 10/2005 | Kamijima | |
| 2005/0257273 A1* | 11/2005 | Naito et al. | 726/26 |
| 2007/0101420 A1* | 5/2007 | Masui | 726/10 |
| 2007/0118650 A1* | 5/2007 | Sugahara | 709/225 |
| 2007/0133044 A1* | 6/2007 | Tanaka | 358/1.15 |
| 2007/0180159 A1* | 8/2007 | Takahashi | 710/8 |
| 2008/0059962 A1* | 3/2008 | Ito | 718/100 |
| 2008/0127307 A1* | 5/2008 | Fukuta | 726/3 |
| 2010/0149570 A1 | 6/2010 | Kamiya et al. | |

FOREIGN PATENT DOCUMENTS

| | | |
|---|---|---|
| JP | 2005-159449 | 6/2005 |
| JP | 2005-202758 | 7/2005 |
| JP | 2005-288879 | 10/2005 |
| JP | 2006-229670 | 8/2006 |
| JP | 2007-095034 | 4/2007 |
| JP | 2007-128207 | 5/2007 |
| JP | 2007-212563 | 8/2007 |
| WO | WO 2007114403 * | 10/2007 |

OTHER PUBLICATIONS

Notice of Grounds of Rejection issued in the corresponding Japanese Patent Application No. 2008-213090 dated Jul. 13, 2010, and an English Translation thereof.

* cited by examiner

| DOCUMENT PROPERTIES |
|---|

| SUMMARY | SECURITY | FONT | DETAILS SETTINGS |

— DOCUMENT SECURITY —

DOCUMENT SECURITY METHOD RESTRICTS MANIPULATION EXECUTABLE FOR DOCUMENT.

SECURITY METHOD: SECURITY BY PASSWORD                    [DISPLAY DETAILS(D)...]

COMPATIBLE VERSION: Acrobat 5.50 AND MORE RECENT VERSIONS

SINCE ALL DOCUMENT CONTENTS ARE ENCRYPTED, SEARCH ENGINE CANNOT ACCESS META DATA OF DOCUMENT.

— SUMMARY OF RESTRICTIONS ON DOCUMENT —

PRINT: PERMITTED
DOCUMENT ASSEMBLY: NOT PERMITTED
COPY AND EXTRACTION OF DOCUMENT: PERMITTED
EXTRACTION OF CONTENT FOR ACCESSIBILITY: PERMITTED
ANNOTATION: NOT PERMITTED
INPUT OF FORM FIELD: PERMITTED
SIGNATURE: NOT PERMITTED
CREATION OF TEMPLATE PAGE: NOT PERMITTED
TRANSMISSION OF FORM: NOT PERMITTED

| | EDIT FUNCTION | USER A | USER B | USER C |
|---|---|---|---|---|
| DOCUMENT EDITING | BIND | – | 3 | – |
| | DELETE PAGE | 4 | – | – |
| | ADD PAGE | – | – | – |
| | REPLACE PAGE | 3 | – | – |
| | UNITE DOCUMENTS | – | 2 | 4 |
| IMAGE EDITING | PRINT FUNCTION (DATE, PAGE) | – | 1 | – |
| | COMBINE BACKGROUND | 1 | – | – |
| | REPEAT | – | – | 1 |
| | CENTERING | 2 | – | – |
| | MIRROR IMAGE | – | – | 3 |
| | REVERSE NEGATIVE AND POSITIVE | – | – | – |

FIG.15

IMAGE FORMING APPARATUS FOR PROCESSING DOCUMENT DATA FILE CAPABLE OF PERFORMING PROCESSING AS SPECIFIED BY A USER ON A DOCUMENT DATA FILE TO BE PROCESSED EVEN IF THE USER LACKS ADEQUATE KNOWLEDGE

This application is based on Japanese Patent Application No. 2008-213090 filed with the Japan Patent Office on Aug. 21, 2008, the entire content of which is hereby incorporated by reference.

BACKGROUND OF THE INVENTION

1. Field of the Invention

The present invention relates to an image forming apparatus, and particularly to an image forming apparatus operating according to attributes of a general-purpose file.

2. Description of the Related Art

With the recent maturing of the digital environment in such places as offices, it has becoming common to computerize documents to be treated. An example of the computerized document data is a PDF (Portable Document Format) file.

To a document data file such as PDF file, an attribute is added for the sake of security. Operations that can be performed respectively on files with respective attributes added thereto differ from each other, depending on the added attributes. As a technique for adding an attribute to a document file, Japanese Laid-Open Patent Publication No. 2004-252784 for example discloses an information processor specifying, for each document, whether printing of the document is permitted or inhibited. Japanese Laid-Open Patent Publication No. 06-035907 discloses a structured document editing apparatus holding an attribute for a structure of a document and identifying an editable document structure among structures of documents to be edited.

A digital multifunction device such as MFP (Multi Function Peripheral) may be equipped with a function similar to an operation (function) controlled by an attribute added to document data. In this case, a user has to determine what processing can be performed on a document data file, based on a combination of the digital multifunction device and the document data file to be processed, and then select an appropriate function. A problem is accordingly that manipulation may be difficult where the user does not have an adequate knowledge for making the above-described determination. It is also a problem that an appropriate function of the digital multifunction device may not be used to perform desired processing on a document data file to be processed, if the user lacks such a knowledge.

SUMMARY OF THE INVENTION

The present invention has been made in view of the problems above. An object of the invention is to provide an image forming apparatus capable of performing processing as specified by a user on a document data file to be processed, even if the user lacks adequate knowledge.

In order to achieve the object above, according to an aspect of the present invention, an image forming apparatus has a plurality of functions for processing a file, and includes an input device for entering which file is specified as a file to be processed, and an instruction about which process is specified as a process for the file, a display, and a controller. The controller is configured to perform: a process for reading an attribute concerning a process for the specified file; a process for determining a function to be used for the specified process for the file, based on the read attribute and the plurality of functions; and a process for presenting on the display a screen for causing the determined function to be executed.

In accordance with an aspect of the present invention, a user who is to process a file can use an available function to allow the processing to be performed on the file, without adequate knowledge. Further, a manager or the like of the file can appropriately restrict processing on the file by other users.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the following description, like parts and like components are denoted by like reference characters. They are named identically and function identically.

Figure 1:
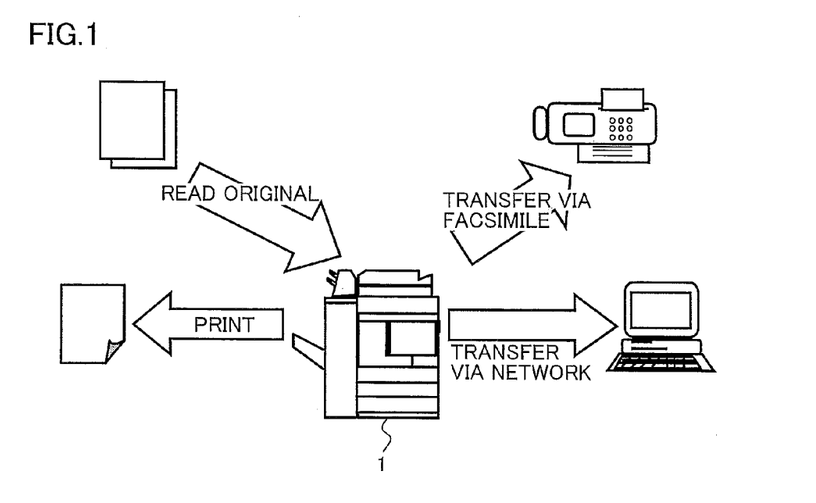
FIG. 1 is a diagram conceptually illustrating functions as a whole of an MFP (Multi Function Peripheral) according to an embodiment.

Referring to FIG. 1, an MFP (Multi Function Peripheral) 1 according to an embodiment reads an original to obtain image data, and outputs the image data by means of various output methods. Specifically, an original that is set on MFP 1 is read through a scanning operation described hereinlater, converted into image data and temporarily stored in an image memory. MFP 1 performs a necessary image transformation process on the image data. The processed image data may be output by any of the methods including transfer via a network, transmission by means of the facsimile function, and printing by means of the printing function of MFP 1. MFP 1 can also obtain image data from another device such as personal computer (PC) via a network, and can store the image data in the image memory as well.

Figure 2:
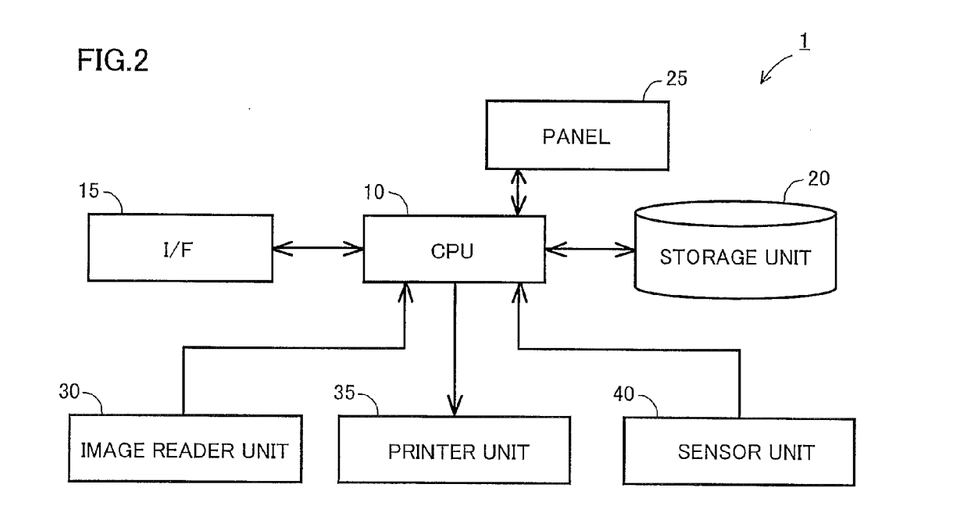
FIG. 2 is a block diagram showing a specific example of a hardware configuration of the MFP according to an embodiment.

Referring to FIG. 2, MFP 1 includes a CPU 10 for controlling the whole device, an image reader unit 30, a printer unit 35 for printing an image on a sheet of paper, an interface (hereinafter I/F) 15 for connecting MFP 1 to the above-mentioned network, or to a telephone circuit for facsimile communication, a storage unit 20, a panel 25, and a sensor unit 40 for detecting the remaining amounts of supplies for example.

Storage unit 20 is configured with an HD (Hard Disk) for example to configure the image memory for example as described above. Storage unit 20 is used for storing image data, information about MFP 1 and a program to be executed by CPU 10, for example. Image reader unit 30 reads an original to obtain image data that is electronic data. Panel 25 serves as a device for displaying various types of information and also a device for entering instructions.

Image data treated by MFP 1 includes document data generated from a read original document. In the present embodiment, examples of the document data file used in MFP 1 include a PDF (Portable Document Format) file and a file used by Office® of Microsoft Corporation that are frequently used as general-purpose files. Attributes are added to these files. "Attribute" refers to restrictive information for restricting the operation performed on the file, added for each function.

Figure 3:
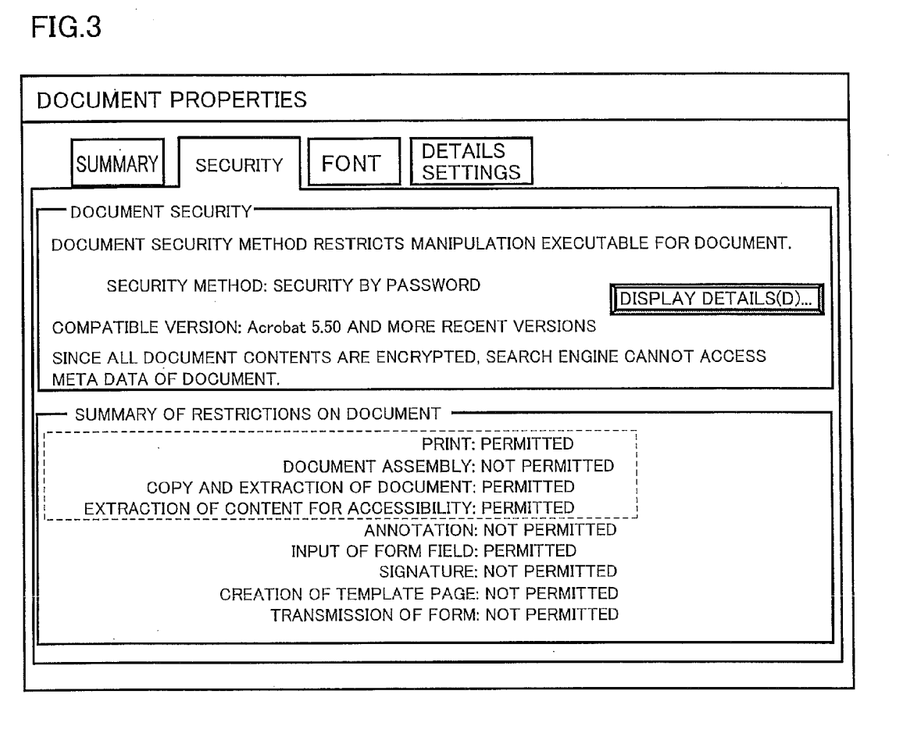
FIG. 3 is a diagram showing a specific example of attributes added to a PDF (Portable Document Format) file.

As shown in FIG. 3, attributes concerning various functions including security are added to a PDF file. Among the attributes shown in FIG. 3, the attributes enclosed by the dotted line are attributes for restricting operations effected by functions according to the MFP which processes this PDF. Specifically, respective attributes concerning the printing function, the document assembly function, the function for copy and extraction of the content, and the function of extracting the content for accessibility correspond to the attributes added to the PDF file.

The attribute concerning the printing function includes "permitted" and "inhibited." In the case where the attribute is "inhibited," the MFP cannot print the PDF file by means of the printing function of the MFP itself. In other words, in the case where the MFP processes this PDF file, a function available for the PDF file is any function other than the printing function. For example, in the case of MFP 1, a function available for the PDF file is a transmission function such as facsimile function. "Document assembly function" refers to the function of uniting documents. "Function of extracting the content for accessibility" refers to the function of extracting a text from a file in reading the text for voice browsing. These attributes also include "permitted" and "inhibited."

Figure 4:
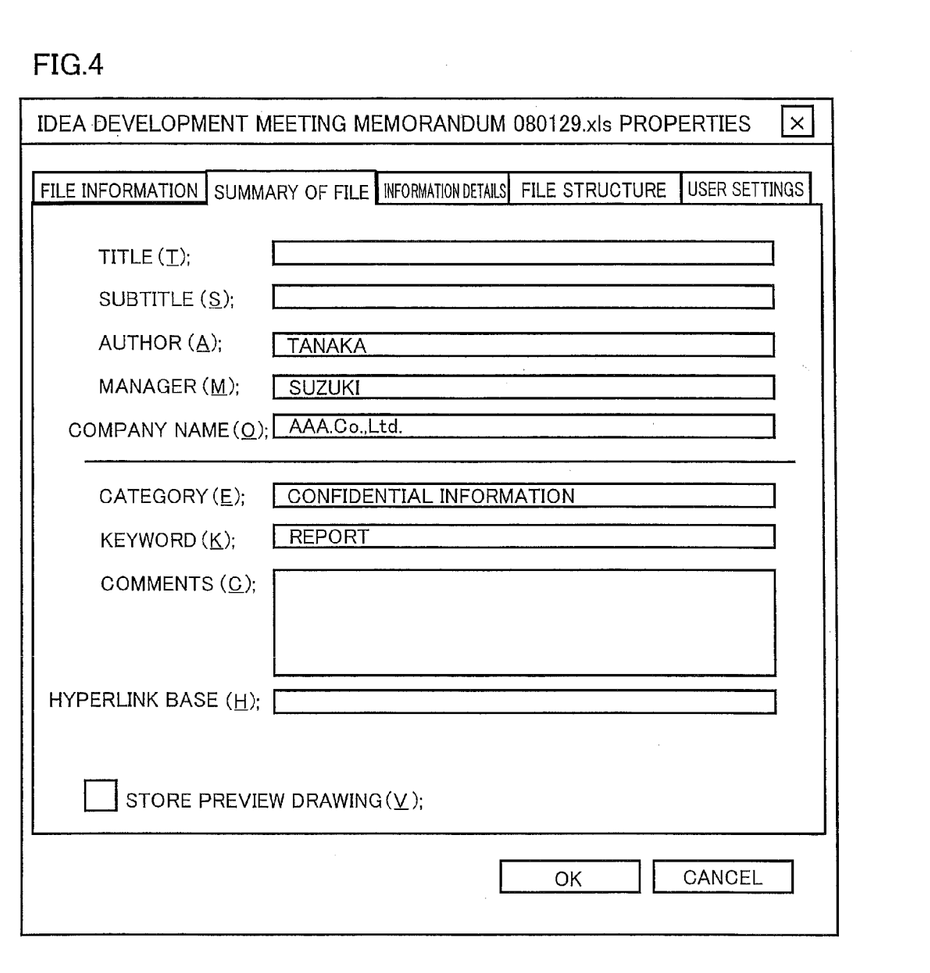
FIG. 4 is a diagram showing a specific example of attributes added to a file used by Office®.

Referring to FIG. 4, to a file used by Office® attributes representing the author of the file and the contents of the file are added. It should be noted that the author represented by the attribute is the person who has created the file, and is not necessarily identical to the user who is using the file.

Figure 5:
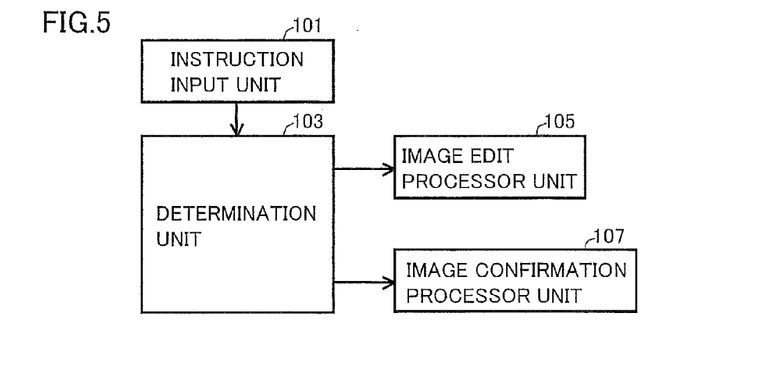
FIG. 5 is a block diagram showing a specific example of a functional configuration for performing an edit specification process by the MFP according to an embodiment.

As shown in FIG. 5, each of the functions of MFP 1 for performing an edit specification process by MFP 1 described hereinlater is chiefly implemented on CPU 10 by reading and executing by CPU 10 of a program stored in storage unit 20. Alternatively, at least a part of the functions may be implemented by the hardware configuration shown in FIG. 2.

Referring to FIG. 5, the above-described functions of MFP 1 include an instruction input unit 101, a determination unit 103, an image edit processor unit 105, and an image confirmation processor unit 107. Instruction input unit 101 accepts input of an instruction represented by a manipulation signal that is entered from panel 25 as manipulated or a manipulation signal transmitted via I/F 15 from another device, and inputs the instruction to determination unit 103. Determination unit 103 analyzes the input instruction to read an attribute of a specified file as required and make a determination about edit details specified by the instruction. According to the result of the determination, determination unit 103 inputs to image edit processor unit 105 or image confirmation processor unit 107 the read attribute together with an instruction signal. Image edit processor unit 105 performs an image edit process described hereinlater on the specified file, according to the input instruction signal. Image confirmation processor unit 107 performs an image confirmation process described hereinlater on the specified file, according to the input instruction signal.

Figure 6:
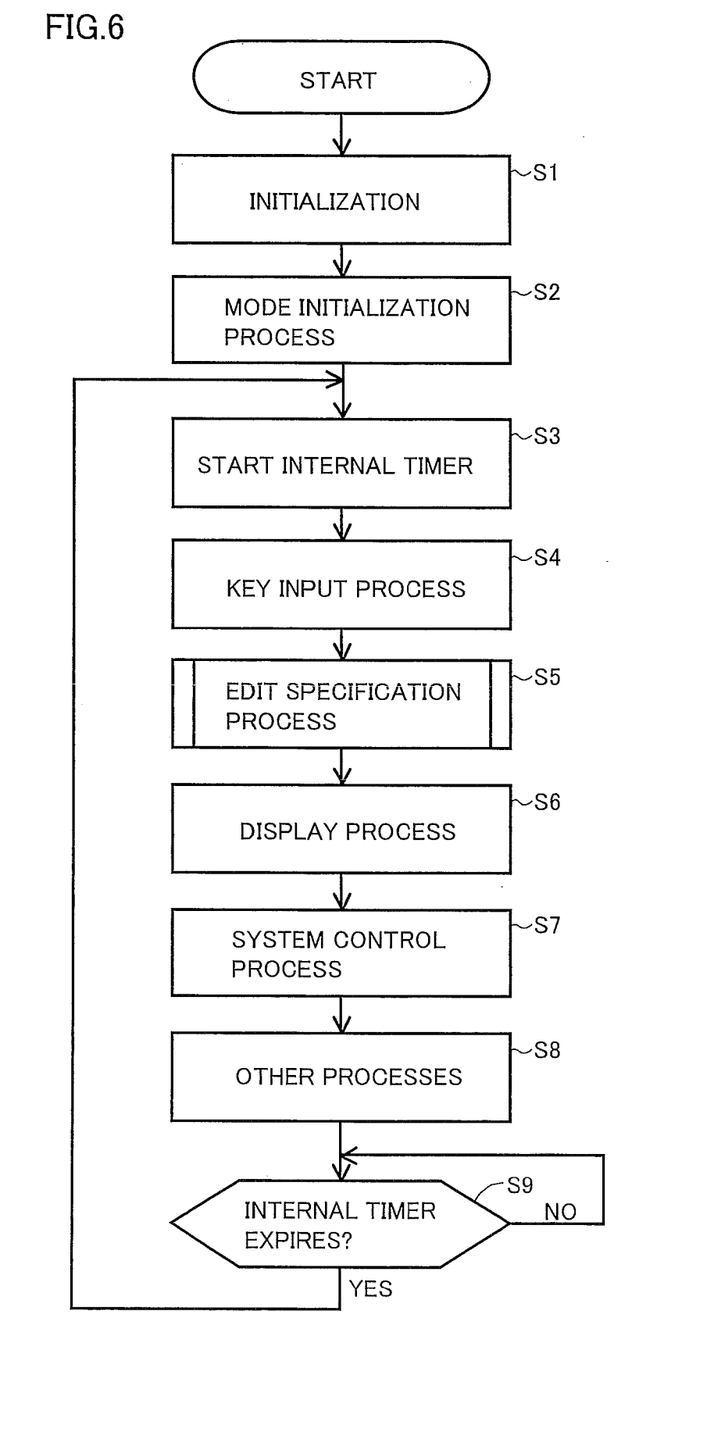
FIG. 6 is a flowchart illustrating a specific example of a flow of a main process performed by the MFP according to an embodiment.

FIG. 6 will be used to describe the main process executed by MFP 1. The process illustrated by the flowchart of FIG. 6 is started at the timing when MFP 1 is activated after MFP 1 is powered or reset, the timing when MFP 1 returns from a power save mode or the like, or the timing when a predetermined time has elapsed from the time when MFP 1 is activated, for example. This process is implemented by CPU 10 reading and executing a program stored in storage unit 20 and controlling each of the functions shown in FIG. 5.

Referring to FIG. 6, CPU 10 starts executing the program. Accordingly, in step S1, initialization setting of CPU 10 such as clearing of a RAM and setting of various registers is carried out. Then, in step S2, an initialization process for the mode of MFP 1 is performed. These processes may be similar to those performed by a CPU of a commonly used MFP.

Figure 7:
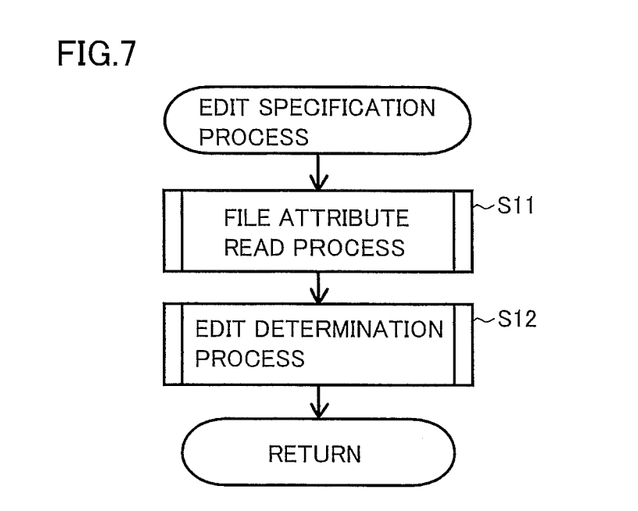
FIG. 7 is a flowchart illustrating a specific flow of the edit specification process.

In step S3, CPU 10 starts clocking for an elapse time defined in advance, using an internal timer of MFP 1. The timer has a counter initialized in the above-described step S2. In step S4, CPU 10 performs an input process for controlling input of a manipulation signal from panel 25 or another device via I/F 15. In step S5, CPU 10 performs an edit specification process based on the input manipulation signal. Referring to FIG. 7, the edit specification process in step S5 includes a process of reading a file attribute in step S11 and an edit determination process in step S12 by determination unit 103. Details of each process will be described hereinlater. CPU 10 performs in step S6 a display process for controlling display of an LCD (Liquid Crystal Display) and an LED (Light Emitting Diode) constituting panel 25, performs in step S7 a system control process for controlling the operation of MFP 1, and performs in step S8 other processes, successively. Specific details of the display process in step S6 and the system control process in step S7 are not limited to particular process details, and may be processes performed in a commonly used MFP. Further, the specific processes in step S8 and their details are not limited to particular process details.

When the internal timer which starts clocking for the elapse time in step S3 has completed clocking for the elapse time, CPU 10 returns to above-described step S3 again and repeats steps S3 to S8 as described above. CPU 10 performs counting of various timers used for respective processes described hereinlater within the time of one routine corresponding to the time defined in advance.

Figure 8:
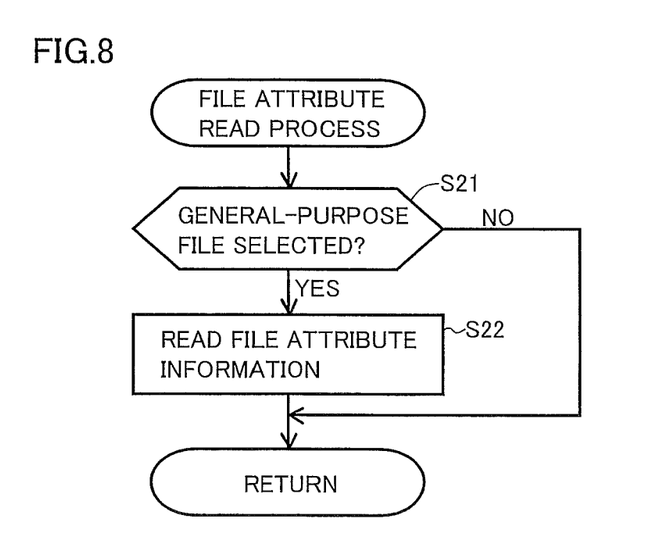
FIG. 8 is a flowchart illustrating a specific flow of a file attribute reading process.

FIG. 8 will be used to describe the process of reading a file attribute in step S11 as described above. Referring to FIG. 8, in the case where instruction input unit 101 accepts specification (selection) of a general-purpose file in step S4 as described above (YES in step S21), determination unit 103 reads in step S22 an attribute added to the specified file as shown in FIGS. 3 and 4, as attribute information about the specified file.

Figure 9:
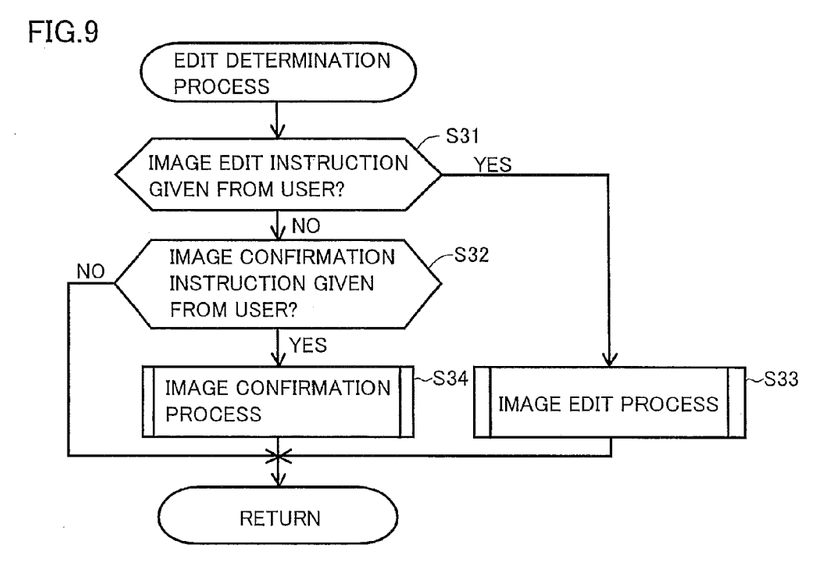
FIG. 9 is a flowchart illustrating a specific flow of an edit determination process.

FIG. 9 will be used to describe the edit determination process in the above-described step S12. In step S12 described above, input of an instruction from a user is accepted and generally, whether or not the image edit process is necessary is confirmed and whether or not the image confirmation process is necessary is confirmed.

Specifically, referring to FIG. 9, in the case where instruction input unit 101 accepts specification of a general-purpose file as well as an image edit instruction in step S4 (YES in step S31), image edit processor unit 105 performs an image edit process in step S33. "Image edit process" refers to a process for editing an image or document. More specifically, "image edit process" refers to a process for editing contents of a document actually specified by a user to be output.

In the case where instruction input unit 101 accepts specification of a general-purpose file as well as an image confirmation instruction in step S4 (NO in step S31 and YES in step S32), image confirmation processor unit 107 performs an image confirmation process in step S34. "Image confirmation process" refers to a process for allowing a user to finally confirm the contents of an image when the image is to be output. The above-described processes are not specified simultaneously. Therefore, in step S4, instruction input unit 101 accepts input of an instruction to perform one of the processes or to perform none of the processes.

Figure 10:
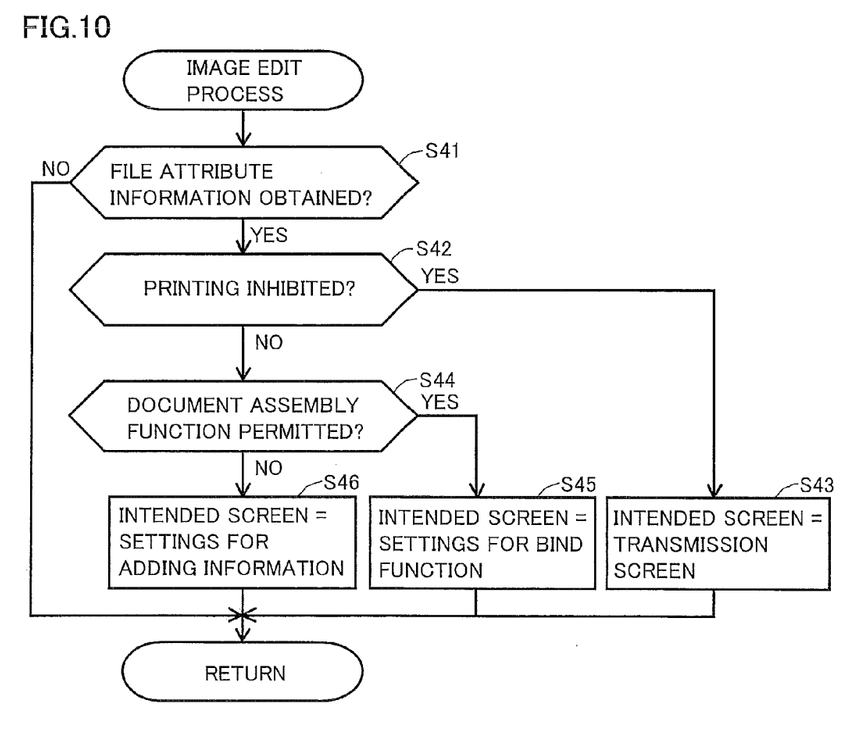
FIG. 10 is a flowchart illustrating a specific flow of an image edit process.

FIG. 10 will be used to describe the image edit process in step S33 as described above. The image edit process in step S33 refers to a process for confirming the file attributes and the functions of MFP 1, determining a function for performing the edit process in consideration of the file attributes, among the functions of MFP 1, and causing the function to be performed. In other words, the image edit process in step S33 is a process for displaying a screen for allowing a user to select the function.

Specifically, referring to FIG. 10, in the case where file attribute information about the specified file is obtained in step S22 as described above (YES in step S41), image edit processor unit 105 analyzes the attribute information and confirms whether or not the attribute representing inhibition of printing of the file is included. Further, it is confirmed whether or not the document assembly function is permitted for this file. In the case where printing is inhibited (YES in step S42), image edit processor unit 105 determines in step S43 that the edit function that can be performed (selected) is the output by transmission, which is another output mode except for printing, among the output functions of MFP 1. Then, image edit processor unit 105 causes "transmission screen" to be displayed for allowing the output to be transmitted to a destination that is designated according to the accepted input of the destination. As shown in FIG. 1, MFP 1 may include a plurality of functions as output functions, in addition to printing, such as the function of transmission by facsimile and the function of transmitting image data to another device. In this case, image edit processor unit 105 may present in step S43 a plurality of output functions of MFP 1 other than the printing function, in such a manner that a desired output function can be selected.

Figure 11:
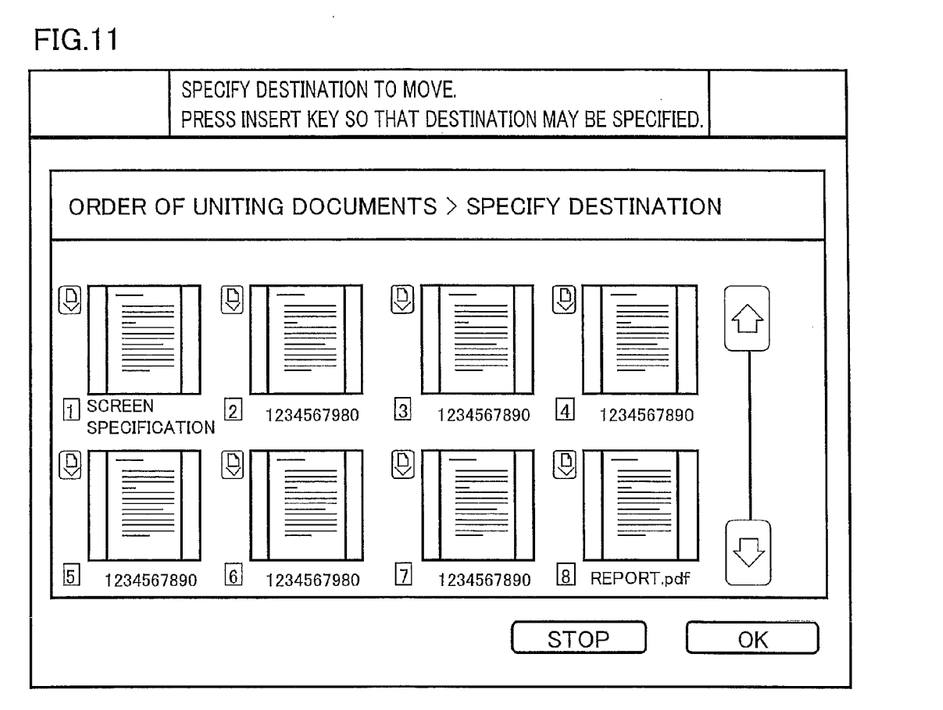
FIG. 11 is a diagram showing a specific example of a screen for binding.

In the case where printing of the file is permitted and the document assembly function is permitted for the file (NO in step S42 and YES in step S44), image edit processor unit 105 determines in step S45 that the edit function that can be performed (selected) is the bind function which is a function for implementing the document assembly function, among the functions of MFP 1. Then, image edit processor unit 105 causes a screen for the bind function to be executed, as exemplarily shown in FIG. 11. "Bind function" refers to a commonly used function provided to an image forming apparatus, for treating a plurality of documents as one document and printing, stapling or arranging the document in the form of a file, for example. "Bind function" corresponds to the document assembly function for a PDF document. On the screen of FIG. 11, image data temporarily stored in MFP 1 is displayed in the form of a list such that desired data can be selected. On the screen, a user can select image data to be processed, select a document to be inserted and designate the position in the image data where the selected document is to be inserted, so that the structure of the document can be freely changed page by page or document by document.

In the case where printing of the file is permitted and the document assembly function for the file is not permitted (NO in step S42 and NO in step S44), image edit processor unit 105 determines in step S46 that the edit function that can be performed (selected) is the function of adding information to an image that is one of the functions of MFP 1 and that is the function which does not implement the document assembly function. Then, image edit processor unit 105 causes the screen for executing the function to be displayed. "Function of adding information to an image" is the simplest edit function. As described above, in the case where MFP 1 includes as the edit functions for image data, the functions that do not implement the document assembly, in addition to the function of adding information to an image, image edit processor unit 105 may present in step S46 these functions such that a desired function can be selected.

Figure 12:
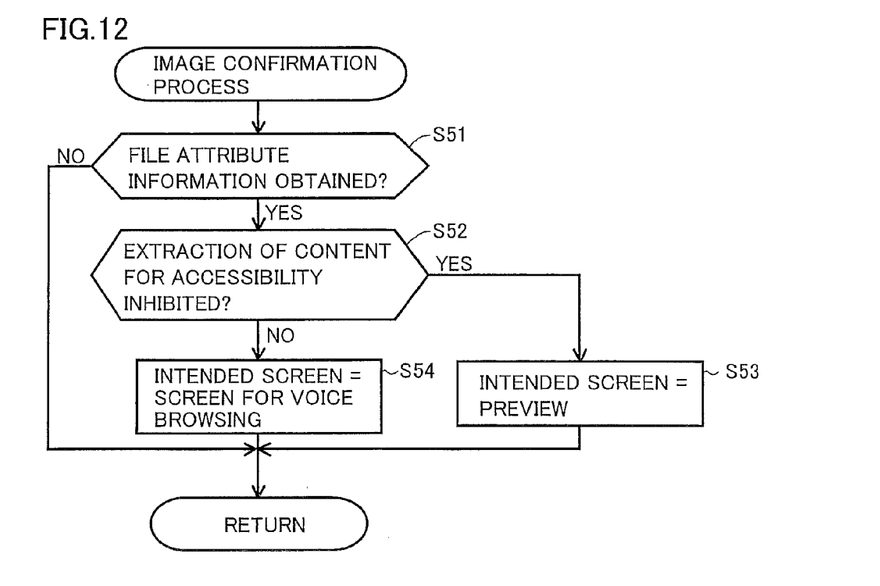
FIG. 12 is a flowchart illustrating a specific flow of an image confirmation process.

FIG. 12 will be used to describe the image confirmation process in step S34 as described above. The above-described image confirmation process in step S34 refers to a process for confirming the file attributes and the functions of MFP 1, determining a function for performing the process of confirming the file in consideration of the file attributes, among the functions of MFP 1, and effecting the function. In other words, the image confirmation process in step S34 as described above is a process for displaying a screen for allowing a user to select the function for executing the process of confirming the file.

Figure 13:
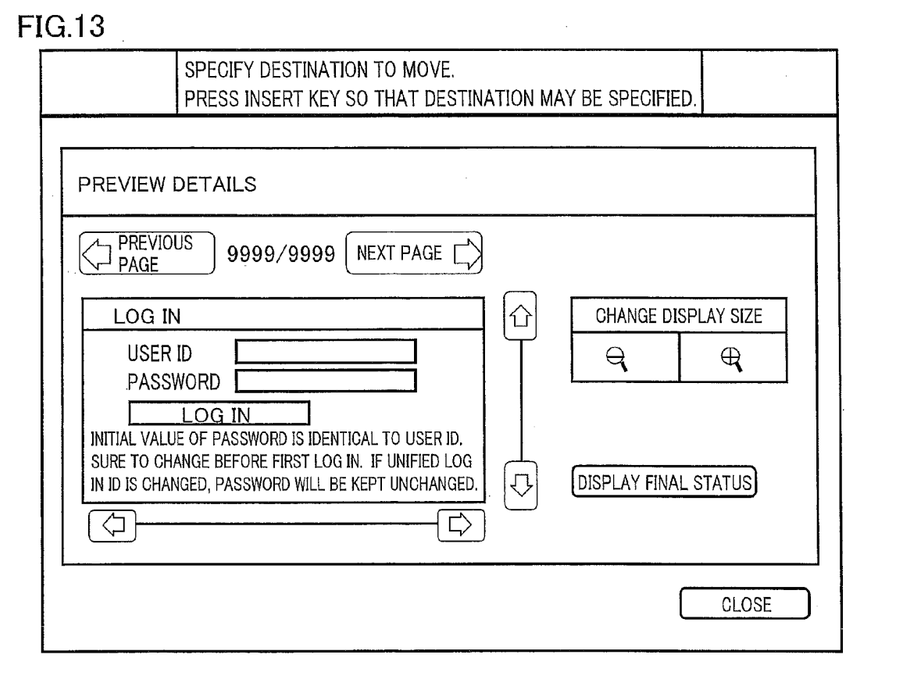
FIG. 13 is a diagram showing a specific example of a preview screen.

Specifically, referring to FIG. 12, in the case where the file attribute information about the specified file is obtained in above-described step S22 (YES in step S51), image confirmation processor unit 107 analyzes the attribute information and confirms whether or not extraction of the content for accessibility of the file is inhibited. In the case where inhibited (YES in step S52), image confirmation processor unit 107 determines in step S53 that the function for executing the process of confirming the file is the preview function, and causes the preview screen as exemplarily shown in FIG. 13 to be displayed. On the screen of FIG. 13, a user makes settings concerning various information necessary for implementing the preview display as well as log-in information for example, and gives an instruction about the display, so that the preview of the file can be displayed. MFP 1 may include, as the confirmation function that does not extract the content for accessibility of the file, functions other than the preview function. In this case, image confirmation processor unit 107 may present, in step S53, other confirmation functions of MFP 1, except for the preview function, such that a desired function can be selected.

In the case where extraction of the content for accessibility of the file is permitted (NO in step S52), image confirmation processor unit 107 determines in step S54 that the function for performing the process of confirming the file is the voice browsing function, which is a function for implementing extraction of the content for accessibility of the file, among the functions of MFP 1, and causes the image for voice browsing to be displayed. "Voice browsing function" refers to a function for extracting a text from the file, converting the text into voice by voice converting means (not shown), and outputting the voice.

MFP 1 carries out the above-described processes based on the attributes set for the file, determines which function is to be used and displays a corresponding screen. Accordingly, a user who is to process the file can know the functions permitted (or inhibited) by the attributes of the file and know the functions of MFP 1 that can be used for the file. Even if the user does not know the function that can be actually used for a desired process, as determined by a combination of the functions, the user may only specify a desired process, so that a screen for using the available function as automatically determined by MFP 1 is displayed. Therefore, the user who is to process the file, even if the user lacks information concerning the available functions, can perform a desired process on the file, by means of MFP 1. Further, the manager or the like of the file can inhibit the user from using a function for the file that does not conform to the intention.

[Modification]

In the above-described example, a manager or the like of a file sets, as a file attribute for the file, the attribute representing inhibition/permission of a function by other users, and accordingly, when the file is specified as a file to be processed, an executable function is determined from permitted functions and presented so that the function can be used. In a modification, file attributes are set for each of other users. The file attributes for each of the users are set on a user basis regardless of the file. The file attributes for each user may be included in the log-in information for each user called user information for example as well as the restrictive information about the functions of the MFP, and stored in MFP 1 or a server or the like (not shown). Therefore, the file attributes for each user may be prepared and edited by the user. Alternatively, the file attributes for each user may be set for each user by a manager or the like of the MFP or a manager or the like of the network (not shown).

Figure 14:
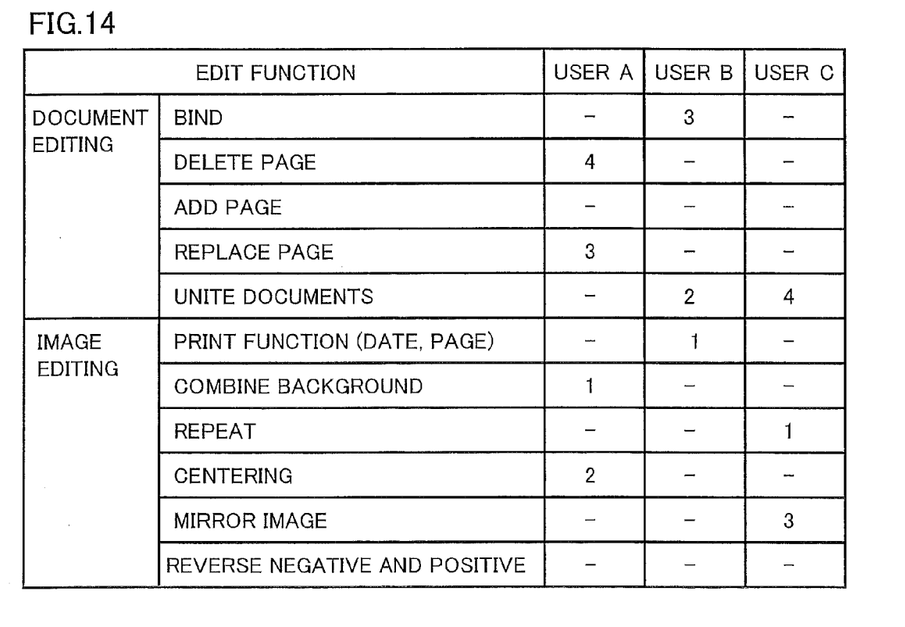
FIG. 14 is a diagram showing a specific example of file attributes set for each user.

FIG. 14 specifically shows a particular example of file attributes concerning functions for editing a file, as set for each user. In the example shown in FIG. 14, for respective functions of MFP 1 used for editing a file, priorities are set for each user that represent which function is used prior to others when the file is edited. The file attributes set for each user are not limited to the attributes with the priorities shown in FIG. 14, but may be attributes representing permission/inhibition of use of the functions as illustrated with reference to FIGS. 3 and 4.

Figure 15:
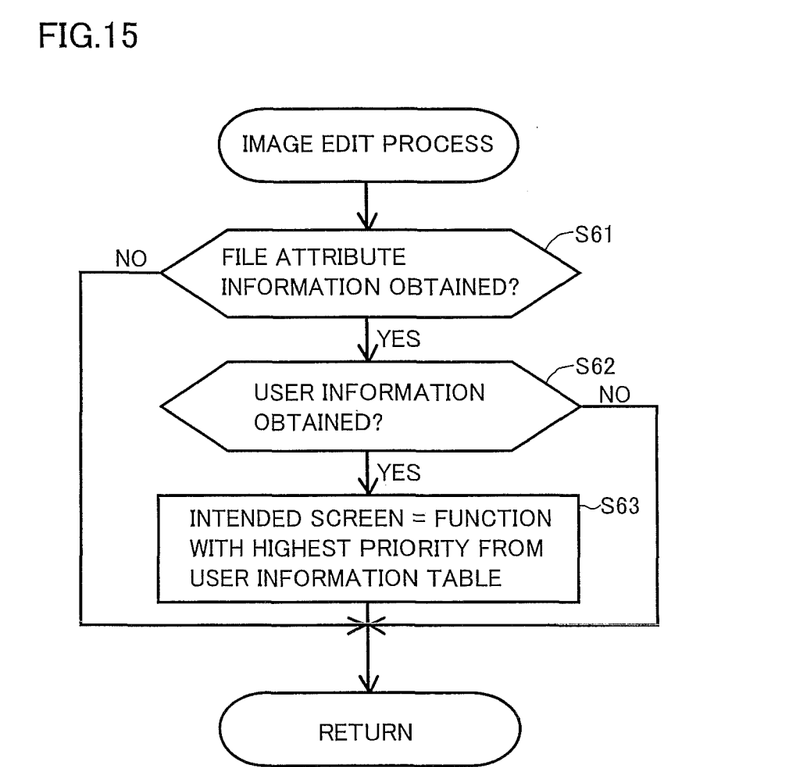
FIG. 15 is a flowchart illustrating a specific example of the image edit process in a modification.

FIG. 15 will be used to describe the image edit process in above-described step S33 in the modification. Referring to FIG. 15, in the modification, in the case where file attributes for the specified file are obtained in step S22 as described above and where the attributes are set for each user (YES in step S61 and YES in step S62), image edit processor unit 105 specifies and analyzes the file attribute information set for each user giving an instruction to edit, based on the log-in information in step S63. Then, image edit processor unit 105 determines that the available edit function is the function with the highest priority for the user. Further, image edit processor unit 105 causes a screen for executing the function to be displayed.

The file attribute information for each user as shown in FIG. 14 may be prepared and edited by the user and MFP 1 may determine the function to be used and display the function on the screen as described above, so that the function that is most appropriate for the personal habit and characteristics of the user or the type of business in which the user is in charge can be made available automatically. Consequently, the manipulation performance for the user can be improved.

In contrast, the file attributes for each user as shown in FIG. 14 may be prepared by the manager of MFP 1 or the manager of the network, for example, and MFP 1 may determine the function to be used and display the function on the screen as described above, so that the manager for example can manage the functions to be used by each user.

In the case where the attribute representing permission/inhibition of each function of MFP 1 is set, image edit processor unit 105 determines in step S63 as described above that the available edit function is the function with its use permitted for the user, and causes a screen for performing the function to be displayed. At this time, if use of a plurality of functions for a specified process is permitted for the user, image edit processor unit 105 may present these functions such that a desired function can be selected, and determine that the selected function is the function to be used.

Further, a program for a computer to execute a process performed by MFP 1 may be provided. Such a program may be recorded on a computer-readable recording medium such as flexible disk, CD-ROM (Compact Disk-Read Only Memory), ROM (Read Only Memory), RAM (Random Access Memory) and memory card attached to the computer, and may be provided as a program product. Alternatively, the program may be provided in the form recorded on a recording medium incorporated in the computer such as hard disk. Furthermore, the program may be downloaded via a network to be provided.

The program may allow a necessary module to be called with a predetermined arrangement and at a predetermined timing, among program modules provided as a part of an operating system (OS) of a computer, so that a process may be carried out. In this case, the program itself does not include the module, and the process is performed in cooperation with the OS. Such a program without module may also be included in the program to be provided.

The program may also be provided in the form incorporated in a part of another program. In this case as well, the program itself does not include modules of that another program as described above, and the process is performed in cooperation with that another program. Such a program incorporated in another program may also be included in the program to be provided.

The program as provided is installed in a program storage such as hard disk and executed. The program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus having a plurality of functions associated with at least one process that can be performed on a file, comprising:
   an input device for specifying a file to be processed, and an instruction for a process to be performed on said file;
   a display; and
   a controller for
   i) reading an attribute pertaining to the process to be performed on said file, wherein the attribute includes priorities for a plurality of functions associated with the process, and wherein said attribute concerning a process for the file is a priority of a function to be used according to said instruction about the process, among said plurality of functions, said priority being set for each user, ii) determining a function, from among the plurality of functions associated with said specified process, to be used to process said file, based on the priorities of the plurality of functions included in said attribute, wherein said controller determines that a function to be used for said process according to said instruction for said file is a function with a higher priority set for a user giving said instruction, and iii) presenting on said display a screen for causing said determined function to be executed.

2. The image forming apparatus according to claim 1, wherein
said attribute includes at least one of an attribute concerning a print function, an attribute concerning a document assembly function and an attribute concerning extraction of a content for accessibility, and
said plurality of functions include at least one of a print function, a document bind function and a preview function.

3. The image forming apparatus according to claim 1, wherein
in a case where said controller accepts input, from said input device, of an instruction to output said file and where said attribute is an attribute representing inhibition of execution of a print function for said file, said controller determines that a function to be used for said specified process is an output function among said plurality of functions that does not use the print function, and presents a screen on said display for designating a designation to which said file is output by said determined function.

4. The image forming apparatus according to claim 1, wherein
in a case where said controller accepts input, from said input device, of an instruction to output said file and where said attribute is an attribute representing permission of execution of a print function for said file, said controller determines that a function to be used for said specified process is an output function among said plurality of functions that uses the print function, and presents a screen on said display for designating a designation to which said file is output by said determined function.

5. The image forming apparatus according to claim 1, wherein
in a case where said controller accepts an instruction to edit said file from said input device and where said attribute is an attribute representing inhibition of execution of a document assembly function for said file, said controller determines that a function to be used for said specified process is an edit function among said plurality of functions that does not use the document assembly function, and presents a screen on said display for editing said file by said determined function.

6. The image forming apparatus according to claim 5, wherein
said edit function that does not use the document assembly function includes a function for adding information to said file.

7. The image forming apparatus according to claim 1, wherein
in a case where said controller accepts an instruction to edit said file from said input device and where said attribute is an attribute representing permission of execution of a document assembly function for said file, said controller determines that a function to be used for said specified process is an edit function among said plurality of functions that uses the document assembly function, and presents a screen on said display for editing said file by said determined function.

8. The image forming apparatus according to claim 1, wherein
in a case where said controller accepts an instruction to confirm said file from said input device and where said attribute is an attribute representing inhibition of execution of a function of extracting a content for accessibility for said file, said controller determines that a function to be used for said specified process is a confirmation function among said plurality of functions that does not use the function of extracting a content for accessibility, and presents a screen on said display for confirming said file by said determined function.

9. The image forming apparatus according to claim 8, wherein
said confirmation function that does not use the function of extracting a content for accessibility includes a preview display function for said file.

10. The image forming apparatus according to claim 1, wherein
in a case where said controller accepts an instruction to confirm said file from said input device and where said attribute is an attribute representing permission of execution of a function of extracting a content for accessibility for said file, said controller determines that a function to be used for said specified process is a confirmation function among said plurality of functions that uses the function of extracting a content for accessibility, and presents a screen on said display for confirming said file by said determined function.

* * * * *